(12) United States Patent
Tonelli et al.

(10) Patent No.: US 10,280,247 B2
(45) Date of Patent: May 7, 2019

(54) NON-AQUEOUS CROSS-LINKABLE FLUOROPOLYMER COMPOSITIONS

(71) Applicant: SOLVAY SPECIALTY POLYMERS ITALY S.P.A., Bollate (IT)

(72) Inventors: Claudio Adolfo Pietro Tonelli, Paderno d'Adda (IT); Solange Barbieri, Baranzate (IT); Giuseppe Marchionni, Milan (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 31 days.

(21) Appl. No.: 15/561,780

(22) PCT Filed: Mar. 22, 2016

(86) PCT No.: PCT/EP2016/056220
§ 371 (c)(1),
(2) Date: Sep. 26, 2017

(87) PCT Pub. No.: WO2016/150942
PCT Pub. Date: Sep. 29, 2016

(65) Prior Publication Data
US 2018/0079850 A1  Mar. 22, 2018

(30) Foreign Application Priority Data

Mar. 26, 2015 (EP) .................... 15161106

(51) Int. Cl.
| | |
|---|---|
| *C08G 18/08* | (2006.01) |
| *C08G 18/50* | (2006.01) |
| *C08G 18/67* | (2006.01) |
| *C09D 175/04* | (2006.01) |
| *C09D 175/14* | (2006.01) |
| *C09D 175/16* | (2006.01) |
| *C08F 20/18* | (2006.01) |
| *C08F 299/02* | (2006.01) |
| *C08J 3/24* | (2006.01) |

(52) U.S. Cl.
CPC .......... *C08G 18/0809* (2013.01); *C08F 20/18* (2013.01); *C08F 299/024* (2013.01); *C08G 18/0814* (2013.01); *C08G 18/0823* (2013.01); *C08G 18/5015* (2013.01); *C08G 18/672* (2013.01); *C08J 3/244* (2013.01); *C09D 175/04* (2013.01); *C09D 175/14* (2013.01); *C09D 175/16* (2013.01)

(58) Field of Classification Search
CPC .. C08G 18/5015; C08G 18/6692; C08J 3/244; C09D 175/16
See application file for complete search history.

(56) References Cited

U.S. PATENT DOCUMENTS

| | | |
|---|---|---|
| 3,242,218 A | 3/1966 | Miller |
| 3,715,378 A | 2/1973 | Sianesi et al. |
| 5,149,842 A | 9/1992 | Sianesi et al. |
| 5,258,110 A | 11/1993 | Sianesi et al. |
| 5,446,205 A | 8/1995 | Marchionni et al. |
| 5,798,409 A | 8/1998 | Ho |

FOREIGN PATENT DOCUMENTS

| | | |
|---|---|---|
| EP | 239123 A2 | 9/1987 |
| EP | 0 784 641 B1 | 1/2002 |
| GB | 1104482 A | 2/1968 |
| WO | 2007102993 A1 | 9/2007 |
| WO | 2008138927 A1 | 11/2008 |
| WO | 2010000715 A1 | 1/2010 |
| WO | 2010028226 A2 | 3/2010 |
| WO | 2013017470 A1 | 2/2013 |
| WO | 2014090646 A1 | 6/2014 |

*Primary Examiner* — Mark S Kaucher

(57) ABSTRACT

The present invention relates to non-aqueous fluoropolymer compositions useful for the preparation of polymeric materials.

14 Claims, No Drawings

NON-AQUEOUS CROSS-LINKABLE FLUOROPOLYMER COMPOSITIONS

CROSS REFERENCE TO RELATED APPLICATIONS

This application is a U.S. national stage entry under 35 U.S.C. § 371 of International Application No. PCT/EP2016/056220 filed Mar. 22, 2016, which claims priority to European application No. 15161106.8 filed on Mar. 26, 2015. The entire contents of these applications are explicitly incorporated herein by this reference.

TECHNICAL FIELD

The present invention relates to non-aqueous fluoropolymer compositions useful for the preparation of polymeric materials.

BACKGROUND ART

Fluoropolymer compositions containing urethane fluoropolymers which comprise ionisable groups are known from the prior art.

For example, WO 2010/000715 (SOLVAY SOLEXIS S.P.A.) discloses composition comprising at least a (per)fluoropolyether derivative which contains at least one fluorinated block and at least one urethane block of formula:

wherein E is a divalent hydrocarbon group, optionally comprising one or more aromatic rings. The fluorinated block may contain at least one functional block comprising at least one ionisable group, like a sulfonic acid group, a carboxy group or an amino group.

WO 2008/138927 (SOLVAY SOLEXIS S.P.A.) discloses compositions comprising (A) at least a (per)fluoropolyether derivative which contains at least one fluorinated block and at least one urethane block of formula:

wherein E is a divalent hydrocarbon group, optionally comprising one or more aromatic rings; (B) at least one fluorocarbon polymer comprising at least one perfluoroalkyl chain linked by ester moieties, urethane moieties and/or urea moieties; and (C) at least one crosslinking agent. The fluorinated block may contain at least one functional block comprising at least one ionisable group, like a sulfonic acid group, a carboxy group or an amino group.

However, these documents do not disclose or suggest compositions comprising (per)fluoropolyether derivatives with opposite charges, i.e. comprising at least one (per)fluoropolyether derivative comprising fluorinated blocks containing at least one ionisable anionic group and at least one (per)fluoropolyether derivative comprising fluorinated blocks containing at least one ionisable cationic group in a defined ratio of ionic equivalents, and curable groups. Furthermore, these documents do not teach or suggest using the compositions for preparing materials endowed with elastic and/or self-healing properties.

WO 2007/102993 (3M INNOVATIVE PROPERTIES CO) relates to surface active block copolymers, their use in the manufacture of a foam composition and articles comprising the polymerised foam composition. The fluorinated block polymers comprise a (per)fluorinated block and may also contain functional blocks typically having one or more polar groups, such as carboxy, sulphonic or amino groups.

Also this document does not specifically disclose or suggest compositions comprising block copolymers containing functional blocks having opposite charges and at the same time curable groups.

WO 2010/028226 (ARROWSTAR LLC) discloses compositions for imparting water and oil repellency to fibers, the compositions comprising a fluorinated polyurethane having a plurality of ionisable groups. This document discloses in particular a mixture of a cationic fluorinated polyurethane, namely Fluorolink® 5032 polyurethane, and an anionic fluorinated polyurethane, namely Fluorolink® P56 polyurethane; the compositions further comprise an acrylic polymer and are in the liquid form. Example 2, in particular, discloses an aqueous composition containing 8.8% by weight Fluorolink® 5032 polyurethane and 30.0% by weight Fluorolink® P56 polyurethane.

From the Applicant's calculations, it appears that the two polymers are not present in a stoichiometric equivalent ratio of ionic groups with opposite charges. Indeed, the equivalent weight of Fluorolink® 5032 polyurethane is 0.25 eq/kg and the equivalent weight of Fluorolink® P56 polyurethane is 0.49 eq/kg; accordingly, in the compositions of example 2, the equivalent ratio between Fluorolink® 5032 polyurethane and Fluorolink® P56 polyurethane is calculated to be 0.2, while the equivalent ratio between Fluorolink® P56 polyurethane and Fluorolink® 5032 polyurethane is calculated to be 6.7.

Also, this document does not teach or suggest replacing water in the preparation of the above compositions and it does not teach or suggest submitting the compositions to cross-linking in order to obtain self-healable and resistant compositions.

U.S. Pat. No. 5,798,409, corresponding to EP 0784641 B (MINNESOTA MINING AND MANUFACTURING COMPANY) discloses both aqueous and non-aqueous two-part polyurethane compositions and optionally self-healable and scratch-resistant coatings prepared therefrom. In particular, the non-aqueous composition comprises a part A and part B, wherein part A may comprise a urethane prepolymer which may contain carboxylic acid functional groups and which has a defined average hydroxyl functionality and a defined hydroxyl equivalent-weight, while Part B contains a cross-linker from the group consisting of polyisocyanates, blocked polyisocyanates, and mixtures thereof and an organic solvent. The NCO:OH ratio of Part B to Part A ranges from about 0.95:1 to about 1.07:1. Part A is curable in the presence of blocked polyisocyanate crosslinker by application of heat or the presence of polyisocyanate crosslinker under staged curing conditions.

These compositions are said to provide a PUR having excellent scratch resistance and self-healability (reference is made in particular to par. [0020]). However, this document neither discloses nor suggests to prepare compositions containing two fluorinated ionizable PUR polymers having opposite charges and at the same time a curable group.

WO 2013/017470 (SOLVAY SPECIALTY POLYMERS ITALY S.P.A.) discloses self-healing polymer compositions comprising:
a) at least one fluorinated ionisable polymer (A), which comprises recurring fluorinated blocks and recurring functional blocks, each of said recurring functional blocks comprising at least one ionisable anionic group, and in which polymer (A) at least one of the said recurring functional blocks is comprised between two fluorinated blocks;
b) at least one fluorinated ionisable polymer (B), which comprises recurring fluorinated blocks and recurring functional blocks, each of said recurring functional blocks comprising at least one ionisable cationic group, and in which polymer (B) at least one of the said recurring functional blocks is comprised between two fluorinated blocks; wherein the ratio between the ionic equivalents of polymer (A) and the ionic equivalents of polymer (B) ranges from 1.1 to 0.9.

However, the polymers herein disclosed do not contain cross-linkable groups, as the groups deriving from acrylate or 2-alkyl acrylate are in the backbone of the polymer and hence are not free for crosslinking reactions.

WO 2014/090646 (SOLVAY SPECIALTY POLYMERS ITALY S.P.A.) relates to non-aqueous fluoropolymers compositions containing polyurethane (PU), polyester or polyacrylates polymers. These compositions, when not balanced (i.e. when the equivalent ratio between ionisable anionic groups of polymer A and ionisable cationic groups of polymer B is different from 1, in particular higher than 1.1 or lower than 0.9—also referred to as "unbalanced compositions") can be further reacted with appropriate reactive monomers, such as for example epoxy monomers containing alkoxy-silane or acrylic groups. However, only the unbalanced compositions containing either free ionisable ionic or cationic groups can react with curable monomers and can be then submitted to cross-linking reactions, giving rise to cross-linked compositions. Differently, the non-aqueous compositions wherein the ratio between the ionic equivalents of polymer (A) and the ionic equivalents of polymer (B) in the dispersion ranges is 1:1 do not contain either free ionisable ionic or cationic groups and hence they cannot be reacted with curable monomers and cannot give rise to cross-linked compositions.

Thus, according to this patent application, it is not possible to obtain crosslinked final coatings with fully balanced formulation (i.e. wherein the equivalent ratio between the ionisable anionic groups of polymer A and ionisable cationic groups of polymer B is equal to 1).

SUMMARY OF INVENTION

The Applicant perceived that none of the methods known in the art, and notably WO 2014/090646 (SOLVAY SPECIALTY POLYMERS ITALY S.P.A.), allows to prepare cross-linkable compositions containing block fluoropolymers having opposite charges with a high degree of compositional flexibility, that is to say cross-linkable compositions containing the two block fluoropolymers having opposite charges in any ratio.

The Applicant also noted that the use of the cross-linker described in the abovementioned WO 2014/090646 reduces the shelf-life of the final composition, as few hours after the manufacturing of the composition an uncontrolled crosslinking can start, thus making the composition useless for the preparation of good quality coatings. Also, it requires high crosslinking temperature (i.e., higher than >100° C.), thus limiting the plastic or natural substrates that can be treated to those stable at such a high temperature.

The Applicant faced the problem to provide crosslinked final coatings with fully balanced compositions, i.e. compositions wherein the equivalent ratio between the ionisable anionic groups and the ionisable cationic groups is equal to 1.

The Applicant has now surprisingly found that it is possible to provide a stable polymer compositions by providing a block fluoropolymers having opposite charges and containing cross-linkable (or curable) groups.

Thus, in a first aspect the present invention relates to a non-aqueous fluoropolymer composition [composition (FC)] comprising:
at least one fluorinated ionisable polymer [polymer (A)] comprising recurring (per)fluorinated blocks [blocks (F)], recurring functional blocks [blocks ($B_a$)] and at least one curable group [group (C)], said blocks ($B_a$) comprising at least one ionisable anionic group [group ($I^-$)];
at least one fluorinated ionisable polymer [polymer (B)] comprising recurring (per)fluorinated blocks [blocks (F)], recurring functional blocks [blocks ($B_b$)] and at least one curable group [group (C)], said blocks ($B_b$) comprising at least one ionisable cationic group [group ($I^+$)];
at least one fluorinated solvent [solvent (F)]; and
at least one solvent [solvent (S)] different from said solvent (F).

Advantageously, the non-aqueous fluoropolymer composition allows to provide crosslinked final coatings also when the composition is fully balanced, i.e. when the equivalent ratio between ionisable anionic groups of polymer (A) and ionisable cationic groups of polymer (B) is 1.

Advantageously, said cross-linkable groups are inserted during the synthesis of polymer (A) and polymer (B), thus avoiding the step of reacting curable monomers with the free ionisable ionic or cationic groups.

Another advantage is that compositions (FC) according to the present invention are ready to use and show a shelf-life of several months.

In a second aspect, the present invention relates to a process for the preparation of a non-aqueous fluoropolymer composition [composition (FC)], said process comprising:
(i) providing at least one polymer (A) as defined above;
(ii) providing at least one polymer (B) as defined above;
(iii) mixing said polymer (A) and said polymer (B) in at least one solvent (F) and in at least one solvent (S).

In a third aspect, the present invention relates to an article comprising at least one layer [layer (L1)] made from composition (FC) as defined above.

DESCRIPTION OF EMBODIMENTS

Within the present description and the following claims:
the terms "cross-linkable" and "curable" are used as synonymous;
the expression "recurring (per)fluorinated blocks" means that a fluorinated block is repeated in the polymer structure;
the expression "ionisable anionic group [group ($I^-$)]" is intended to indicate a functional group that under appropriate pH conditions forms an anionic group bearing one or more negative charges;
the expression "ionisable cationic group [group ($I^+$)]" is intended to indicate a functional group that under appropriate pH conditions forms a cationic group bearing one or more positive charges.

Preferably, said (per)fluorinated block [block (F)] is a (per)fluoropolyether block comprising a (per)fluoropolyoxylakylene chain [herein after also referred to as chain ($R_{OF}$)] which comprises, preferably consists of, recurring units having at least one catenary ether bond and at least one fluorocarbon moiety; typically, said chain ($R_{OF}$) comprises one or more randomly distributed repeating units R°, which are selected from the following groups:
(i) —CFXO—, wherein X is F or $CF_3$;
(ii) —$CF_2$CFXO—, wherein X is F or $CF_3$;

(iii) —CF$_2$CF$_2$CF$_2$O—;
(iv) —CF$_2$CF$_2$CF$_2$CF$_2$O—.

Preferably, the repeating units are selected from —CF$_2$O— and —CF$_2$CF$_2$O— units in a molar ratio ranging preferably from 0.1 to 10, more preferably from 0.5 to 5.

Preferably, said block (B$_a$) comprises, preferably consists of, a hydrocarbon chain [chain (R$_H$)], optionally comprising one or more aromatic, heteroaromatic, cycloaliphatic or heterocycloapliphatic groups, said chain (R$_H$) comprising at least one group (I$^-$).

Suitable anionic groups (I$^-$) are, for example, carboxylic acid groups of formula —COOH, sulphonic acid groups of formula —SO$_3$H, phosphoric acid groups of formula —OPO$_3$H$_4$.

An exemplary chain (R$_H$) comprising an ionisable anionic group has formula (R'$_{HC}$):

chain (R'$_{HC}$)

wherein T is a trivalent hydrocarbon group selected from a linear or branched C$_1$-C$_{12}$ hydrocarbon chain, a C$_3$-C$_{12}$ cycloaliphatic, C$_3$-C$_{12}$ heterocycloaliphatic, C$_5$-C$_{12}$ aromatic or C$_5$-C$_{12}$ heteroaromatic group. More preferably, said chain (R'$_{HC}$) can be selected from any one of the followings:

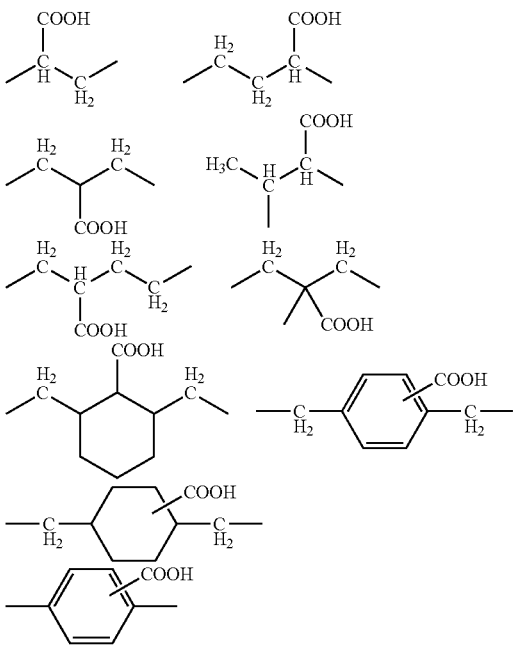

In a preferred embodiment, chain (R'$_{HC}$) complies with formula:

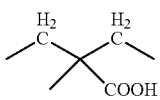

Preferably, said block (B$_b$) is as block (B$_a$) defined above.

Suitable cationic groups (I$^+$) are nitrogen-containing ionisable groups, such as amine groups, which may be either divalent and comprised in the chain (R$_H$) backbone, according to formula —N(R$_N$)—, wherein R$_N$ is selected from H and hydrocarbon groups having 1 to 6 carbon atoms, or monovalent and comprised in side groups having formula —N(R$_{N1}$)(R$_{N2}$), wherein R$_{N1}$ and R$_{N2}$, equal to or different from one another, are independently selected from hydrogen and hydrocarbon groups containing from 1 to 6 carbon atoms.

Preferably, a chain (R$_H$) comprising a ionisable group which forms a cationic group has formula (R"$_{HC}$):

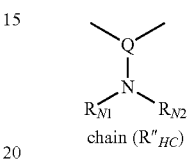

chain (R"$_{HC}$)

wherein R$_{N1}$ and R$_{N2}$ have the same meanings as defined above, Q is a trivalent hydrocarbon group selected from a linear or branched C$_1$-C$_{12}$ hydrocarbon chain, a C$_3$-C$_{12}$ cycloaliphatic, C$_3$-C$_{12}$ heterocycloaliphatic, C$_5$-C$_{12}$ aromatic or C$_5$-C$_{12}$ heteroaromatic group. More preferably, said chain (R"$_{HC}$) complies with the following formula:

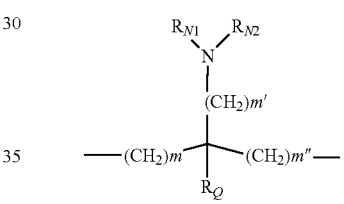

wherein R$_{N1}$ and R$_{N2}$ have the same meanings as defined above; more preferably, R$_{N1}$ and R$_{N2}$ are independently selected from linear or branched C$_1$-C$_4$ alkyl groups; m, m' and m" are 0 or a integers from 1 to 4, with the proviso that at least one of m and m" is not zero and R$_Q$ is H or a linear or branched C$_1$-C$_4$ alkyl group. Preferred chains (R"$_{HC}$) are those of formulae —CH(CH$_2$—N(C$_2$H$_5$)$_2$)—CH$_2$— and —CH(CH$_2$—N(CH$_3$)$_2$)—CH$_2$—.

Preferably, chain (R$_H$) comprising a ionisable group which forms a cationic group under appropriate pH conditions has formula (R'''$_{HC}$):

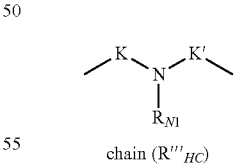

chain (R'''$_{HC}$)

wherein R$_{N1}$ has the same meanings defined above; preferably, R$_{N1}$ is selected from C$_1$-C$_4$ alkyl groups and K and K' are divalent hydrocarbon groups having from 1 to 6 carbon atoms.

According to a preferred embodiment, said polymer (A) and/or polymer (B) comprise blocks (F) alternated to said blocks (B).

Preferably, said blocks (F) and said block (B$_a$) in polymer (A) are linked together by at least one moiety [moiety (U)] selected from urethane moieties and urea moieties.

Preferably, said blocks (F) and said blocks (B$_b$) in polymer (B) are linked together by at least one moiety [moiety (U)] as disclosed above for polymer (A).

Preferably, said moiety (U) is an urethane moiety. More preferably, said urethane moiety complies with formula (I) below:

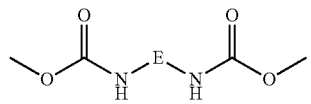
(I)

wherein E is a divalent linear or branched hydrocarbon group, typically a $C_1$-$C_{12}$ hydrocarbon group, optionally comprising one or more cycloaliphatic, heterocycloaliphatic, aromatic or heteroaromatic groups, typically $C_3$-$C_{12}$ cycloaliphatic, $C_3$-$C_{12}$ heterocycloaliphatic, $C_5$-$C_{12}$ aromatic or $C_5$-$C_{12}$ heteroaromatic groups.

Preferred heteroaromatic groups are for example phosphazene, triazine and triazole.

Preferably, E is selected from:

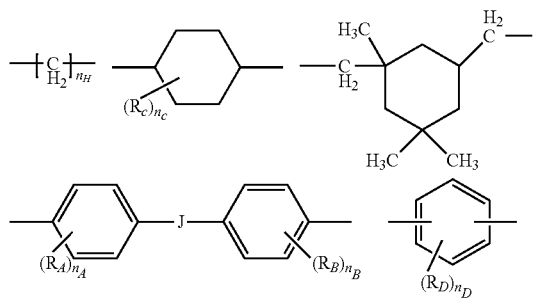

and mixtures thereof;
wherein:
  $n_H$ is an integer from 1 to 12, preferably equal to 6;
  J is a divalent bridging group selected from: a single bond; a methylene group (—CH$_2$—); an oxygen atom (—O—); a —C(CH$_3$)$_2$— group; a —C(CF$_3$)$_2$— group; a —SO$_2$— group; a —C(O)— group; preferably J is a methylene group;
  each of $R_A$, $R_B$, $R_C$ and $R_D$, equal or different at each occurrence, is independently a halogen atom (e.g. Cl, Br, F), a $C_1$-$C_6$ hydrocarbon group (e.g. methyl, ethyl), a substituent group like notably —OR$_{H'}$, —NR$_{H'}$R$_{H''}$, —C(O)—R$_{H'''}$, wherein R$_{H'}$, R$_{H''}$, R$_{H'''}$ and R$_{H''''}$, equal to or different from each other, are independently at each occurrence a hydrogen atom or a $C_1$-$C_6$ hydrocarbon group;
  $n_A$, $n_B$ and $n_D$ are independently 0 or integers comprised between 1 and 4;
  $n_C$ is 0 or an integer comprised between 1 and 10.

Said chain (R$_{OF}$) may advantageously comprise terminal bridging groups bound to the moiety (U); such terminal bridging groups having formula —CF$_2$CH$_2$(OCH$_2$CH$_2$)$_{s'}$—, wherein s', equal or different at each occurrence, is 0 or an integer from 1 to 5. For example, the binding between the bridging group and the —OC(O)— group in the above moieties of formula (I) above is depicted in the following scheme:

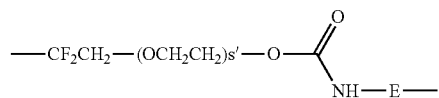

Preferably, said at least one group (C) is a group derived from acrylate or 2-alkyl acrylate. More preferably, said at least one group (C) can be an UV curable group or a thermally curable group.

UV-curable formulations are particularly preferred because they can be used at ambient temperature and, hence, can be applied to a large variety of substrates, avoiding their thermal degradation.

Preferably, said at least one group (C) is a UV-curable group derived from an acrylate or a 2-alkyl acrylate, such as for example hydroxyethylmethylacrylate, hydroxymethylmethylacrylate, hydroxyethylacrylate, ethyl-isocyanate methacrylate.

Said at least one group (C) is typically present as pendant group and/or as terminal group.

Preferably, said solvent (F) is a hydrocarbon or aromatic solvent containing one or more fluorine atoms and, optionally, one or more oxygen atoms. More preferably, said solvent (F) is selected from hydrofluoroethers (HFEs), hydrofluoropolyethers (HFPE), 1,3-bis(trifluoromethyl)benzene (hexafluoroxylene) and mixtures thereof. Examples of suitable HFWs are those known as Novec® fluids, commercially available from 3M. Examples of HFPE are known as H-Galden® HFPEs.

Preferably, said solvent (S) is selected in the group comprising alcohols, such as isopropylalcohol; and aprotic dipolar solvents, such as propylenglycole-mono methyl ether-acetate (PMA), sulfolane and dimethyl sulfoxide (DMSO).

The ratio between the ionic equivalents of polymer (A) and the ionic equivalents of polymer (B) in composition (FC) according to the present invention is not particularly limited and can be 1:1 or higher or lower than 1:1. Compositions wherein the ratio is 1:1 can be also referred to as "balanced compositions", while compositions wherein the ratio is higher or lower than 1:1 can also be referred to as "unbalanced compositions".

Polymer (A) and polymer (B) are advantageously prepared before mixing this two components to prepare the composition (FC) according to the present invention, so that both balanced and unbalanced formulation can be prepared without detrimental effect on the crosslinking ability.

Polymers (A) and polymers (B) can be preferably prepared by reacting at least one (per)fluoropolyoxyalkylene with at least one diisocyanate, at least one functionalized diol comprising at least one ionisable anionic or cationic group and at least one compound containing an acrylate or a 2-alkyl acrylate group.

In greater detail, the synthesis can be performed by reacting:
a) at least one hydroxy-terminated (per)fluoropolyoxyalkylene complying with the following formula (II):

Z—O—R$_{OF}$—Y (II)

wherein R$_{OF}$ is as defined above and Z and Y, equal to or different from each other, are independently a group of formula —CF$_2$CH$_2$(OCH$_2$CH$_2$)$_{s'}$—W, wherein s', equal or different at each occurrence, is 0 or an integer comprised between 1 and 10 and W is selected from —OH and —NHR$^X$ wherein R$^X$ is H or linear or branched $C_{1-6}$ alkyl;

b) at least one diisocyanate of formula OCN-E-NCO, wherein E is as defined above;

c) at least one functionalized diol comprising at least one ionisable group, having formula HO—$R_H$—OH, wherein $R_H$ is selected in the group comprising linear or branched $C_1$-$C_{12}$ hydrocarbon chain; $C_3$-$C_{12}$ cycloaliphatic, $C_3$-$C_{12}$ heterocycloaliphatic, $C_5$-$C_{12}$ aromatic and $C_5$-$C_{12}$ heteroaromatic group; aliphatic, cycloaliphatic and aromatic diamine, such as ethylendiamine, hexamethylenediamine, isophorone diamine, p-xylidendiamine; and d) a compound comprising at least one acrylate or 2-alkyl acrylate group is added. Hydroxyethylmethylacrylate, hydroxymethylmethacrylate, hydroxyethylacrylate, ethyl isocyanate methacrylate are preferred.

The hydroxy-terminated (per)fluoropolyoxyalkylenes of formula (II) here above can be prepared starting from the corresponding (per)fluoropolyoxyalkylenes having —COF end groups as taught in GB 1104482 (MONTEDISON SPA) 28 Feb. 1968, U.S. Pat. No. 3,715,378 (MONTEDISON SPA) 6 Feb. 1973, U.S. Pat. No. 3,242,218 (DUPONT) 22 Mar. 1996, EP 239123 A (AUSIMONT SPA) 30 Sep. 1987, U.S. Pat. No. 5,149,842 (AUSIMONT SRL) 22 Sep. 1992, U.S. Pat. No. 5,258,110 (AUSIMONT SRL) 11 Feb. 1993. Preferred examples of hydroxy-terminated perfluoropolyethers are those marketed under the tradename Fomblin Z DOL®; most preferably, Fomblin Z DOL® perfluoropolyethers having molecular weight of 4000 Da or 2000 Da are used for the preparation of the compositions of the invention.

The amino-terminated (per)fluoropolyoxyalkylenes of formula (II) here above can be prepared by chemical reduction of PFPE esters as described in U.S. Pat. No. 5,446,205 (AUSIMONT S.P.A.).

Diisocyanates of formula OCN-E-NCO are preferably selected from the followings: hexamethylendiisocyanate (HDI), trimethylhexamethylenediisocyanate, isophorone diisocyanate (IPDI), 4,4'-methylenebis(cyclohexylisocyanate) (H12-MDI), cyclohexyl-1,4-diisocyanate, 4,4'-methylenebis(phenylisocyanate) (MDI) or its isomers, toluene 2,4-diisocyanate (TDI) or isomers thereof, xylylene diisocyanate, naphthalene-1,5-diisocyanate, p-phenylenediisocyanate. According to a preferred embodiment, the diisocyanate is isophorone diisocyanate (IPDI).

Preferably, the synthesis of polymers (A) and (B) is performed, for example, by dissolving in a suitable organic solvent a hydroxy-terminated (per)fluoropolyoxyalkylene complying with formula (II) above and a diisocyanate of formula OCN-E-NCO, in which E is as defined above, in a suitable organic solvent, in the presence of a polymerization catalyst, typically dibutyltin dilaurate.

Suitable organic solvents are ketones or acetates having a boiling point higher than 60° C., like methyl-ethyl-ketone and butyl acetate, partially fluorinated solvents like H-Galden® hydrofluoropolyether or hexafluoroxylene (HFX).

The resulting mixture is usually heated up to a temperature ranging from 60° C. to 70° C. until the reaction (hereinafter referred to as polymerization reaction) is complete.

Then, the reaction temperature is preferably lowered to less than 60° C., more preferably to less than 40° C., even more preferably to room temperature.

Thereafter, a functionalized diol of formula HO—$R_H$—OH, optionally salified with a suitable salifying agent, dissolved in the same solvent as used in the polymerization reaction is added.

Then, a compound comprising at least one acrylate or 2-alkyl acrylate group is added. Hydroxyethylmethylacrylate, hydroxymethylmethacrylate, hydroxyethylacrylate, ethyl isocyanate methacrylate are preferred.

A further chain extender of formula HO—$R_{diol}$—OH and/or of formula $H_2N$—$R_{diamine}$—$NH_2$, wherein $R_{diol}$ and $R_{diamine}$ are as defined above can be added in addition to the functionalised diol of formula HO—$R_H$—OH.

Salifying agents for the preparation of anionic polymers (A) can be organic or inorganic. Organic salifying agents, such as triethylamine, are preferred.

Preferably, composition (FC) according to the present invention is in the form of a solution.

When preparing composition (FC), the amounts of polymer (A) and of polymer (B) in the composition (FC) are selected so as to obtain the desired ionic equivalent ratio.

Preferably, step (iii) is performed by adding polymer (A), polymer (B), solvent (F) and solvent (S) to each other in any order.

Preferably, polymer (A) and polymer (B) are added to the mixture of solvent (F) and solvent (S).

Preferably, step (iii) is performed at a temperature ranging from room temperature to a temperature at least 10° C. lower than the boiling temperature of the lowest-boiling solvent in the mixture, more preferably step (iii) is performed at room temperature.

Preferably, step (iii) is performed according to conventional techniques, such as for example magnetic or mechanical stirring.

A photo-initiator can be added to composition (FC), preferably in an amount of from 1 to 10 wt. % with respect to the weight of the solute of composition (FC).

Said photo-initiator can be selected for example from benzophenone, 2-hydroxy-4'-(2-hydroxyethoxy)-2-methylpropiophenone, 1-hydroxy-cyclohexyl phenyl ketone. More preferably, said photo-initiator is 2-hydroxy-2-methyl-1-phenyl-propan-1-one, which is commercially available for instance from Ciba under the trade name Darocur® 1173.

Composition (FC) according to the present invention can be used for example for preparing polymeric articles, preferably amorphous articles endowed with elastic properties (softness and deformability), for example in the form of sealing agents, gaskets, membranes, films and coatings.

This polymeric materials are typically prepared by film-casting or moulding composition (FC) and then curing said composition (FC) by thermal or UV activated crosslinking.

These polymeric materials are endowed with high chemical stability and with improved mechanical properties. In particular, it has been observed that certain polymeric materials prepared from composition (FC) are endowed with self-healing (or self-repairing) properties.

Should the disclosure of any patents, patent applications and publications which are incorporated herein by reference conflict with the description of the present application to the extent that it may render a term unclear, the present description shall take precedence.

The invention will be herein after illustrated in greater detail by means of the Examples contained in the following Experimental Section; the Examples are merely illustrative and are by no means to be interpreted as limiting the scope of the invention.

EXPERIMENTAL SECTION

Materials

Isophorone diisocyanate (IPDI), dibutyltindilaurate (DBTDL), methy-ethylketone (MEK), hexafluoroxylene (HFX), triethylamine (TEA), dimethylolpropionic acid (DMPA), 1,2-propandiol (1,2-PD), neopenthylglycole, diethylamine-propanediol (DEAPD), acetic acid, ethyl acetate (AcOEt), isopropanol (IPA), Imicure® EMI-24, tetraethylorthosilicate (TEOS) and hydroxyethylmethacrylate (HEMA) were purchased from Aldrich® and used as received.

Fomblin ZDOL® PFPE: $HOCH_2CF_2(OCF_2CF_2O)_m(CF_2O)_nCF_2CH_2OH$ (m/n=2.0; MW=4000 and 2000) was obtained from Solvay Specialty Polymers.

Hydrofluoroethers Novec® HFE 7200 and HFE 7500 were purchased from 3M and used as received.

Methods

Potentiometric Titration of Chloride Ions (Washing Water of Acid Polyurethane—Method 1)
Sample: 10 g (exactly weighed)
Solvent: water
Titrating agent: $AgNO_3$ 0.1 N
Electrode: DM141SC Mettler Toledo Analytical Procedure for Acid Polyurethane (Method 2)
Sample: 1-3 g (exactly weighed)
Solvent: HFX/IPA 50/10 (ml)
Titrating agent: tetramethylammonium hydroxide TMAI 0.1M in $CH_3OH$
Electrode: DG115SC Mettler Toledo Analytical Procedure for Basic Polyurethane (Method 3)
Sample: 1-3 g (exactly weighed)
Solvent: HFX/IPA 50/10 (ml)
Titrating agent: HCl 0.1M in IPA
Electrode: DG115SC Mettler Toledo Kinematic Viscosity Kinematic viscosity was determined according to ASTM D445 by measuring the time for a volume of composition sample to flow under gravity through a calibrated glass capillary Kannon-Fenske Routine viscometer immersed in a thermostatic bath set at 20° C.

Contact Angle
$q_M$ (°) at time zero
Solvent: $H_2O$ MilliQ—q(°) average value on 10 drops
Deposition of the samples (2 ml): automatic mode—speed 0.5 ml/s Hardness
Shore A 3"—DIN53504 S2
cross velocity 200 mm/min.

Cross-cut Test

The Elcometer Cross Hatch Cutter is a simple but effective instrument for assessing the adhesion or resistance to separation of coatings from substrates. It can be used in accordance with the following International Standards: AS 1580.408.4, AS 3894.9, ASTM D3359-B, EN 13523-6 (superseding ECCA T6), ISO 2409 (superseding BS 3900-E6 & NF T30-038), ISO 16276-2 and JIS K 5600-5-6. The coated supports under examination were notched using and Elcometer 1542 Cross Hatch Cutter to form a grid, then an adhesive tape selected in accordance with the aforee-mentioned ASTM method was applied and removed. Thereafter, the number of squares remained on the support was counted and expressed as percentage (reported as 100/100 in Tables 1 and 3).

Solvent Rub Test—MEK (Referred to as DR Mek in the Tables)

Solvent resistance was evaluated by means of the Solvent Rub Test according to ASTM D4752 and NCCA 11-18. This test method is used to determine the degree of cure of a baked film by the film resistance to a specified solvent. The test is usually performed using methyl ethyl ketone (MEK) as the solvent. The MEK resistance or degree of cure applies to paint topcoats and primers. ASTM D4752 envisages rubbing the surface of a baked film with a cheesecloth soaked with MEK until failure or break of the film occurs. The type of cheesecloth, the stroke distance, the stroke rate, and the approximate applied pressure of each rub are specified. Rubs were counted as double rubs (one rub forward and one rub backward constitutes a double rub). The test was stopped when damage of the coating is observed or at a limit value of 200 double rubs (DR). The data are reported in Tables 1 and 3 below.

Scratch-test

Circular scratches were made with a tip on the sample under examination. The tip material was driven on the sample surface with a known and constant load, which was progressively increased (double range: from 0.1-1 N to 1-10N). Table 2 reports the load which corresponds to the formation of a scratch on the surface (visual inspection). After 24 hours and 2 weeks at room temperature and without any treatment of the sample, the sample was inspected in order to establish whether self-repairing had occurred. If the sample was still damaged, the load corresponding to the remaining damage was recorded.

Due to the fact that in some cases no scratch was observed on the samples at a load as high as 10N, four overlapping circular scratches were made at a load of 10 N, then self-repairing was evaluated as explained above.

Spot Tests

Drops of solvents, acids or basis were deposited onto the samples (coatings); after evaporation the samples were visually inspected to verify whether marks or sings of damage had formed. The data are reported in Table 4.

Preparation of Acid and Basic Polyurethanes

Preparation 1

Acid Polyurethane from Fomblin® Z DOL PFPE MW 4000 Containing 0.2 eq/kg of Acid Groups (PU-A1)

Step 1) Preparation of the Prepolymer

A glass reactor was charged with IPDI (27.8, 251 meq), Fomblin Z DOL® perfluoropolyether MW 4000 (200 g, 102 meq) and methylethylketone (MEK) (20 g). The reaction mass was warmed up to 50° C., under mechanical stirring, then dibutyltin dilaurate (DBTDL, 0.43 ml, 5% solution in AcOEt) was added; a spontaneous increase of the internal temperature to 55° C. was observed. Thereafter, the temperature was increased to 65° C. and kept at this value for two hours. The completion of the reaction was monitored by $^{19}$F-NMR.

Step 2) Chain-extension

The internal temperature of the reaction mass from step 1) was lowered to 50° C. and a solution of dimethylol propionic acid (DMPA, 6.8 g, 102 meq), salified with an equivalent ratio of triethylamine (TEA, 4.10 g) in MEK (50 ml) was added dropwise. After 30 minutes, 6.1 g (47 meq) of hydroxyethyl methacrylate were added. The completion of the reaction was monitored by IR, until disappearance of the typical —NCO band (2225 cm$^{-1}$).

Step 3) Acidification, Washings and Drying

The reaction mixture from step 2 was cooled to room temperature, then Novec® HFE 7500 (750 g) and isopropanol (250 g) were added under stirring. After obtainment of a clear solution, 3% HCl was added dropwise until the pH became acid. After 10 minutes under mechanical stirring, demineralised water was added (500 g) and the mixture was transferred into a separatory funnel. The aqueous phase was discharged, then the organic phase was washed with water until complete removal of chloride ions in the washing water (analytical control by titration according to method 1). The bottom organic layer, containing 20-30% w/w of solubilized polymer, was concentrated at 60° C. in vacuum. This concentrated solution contained only the PFPE-PU polymer and the HFE solvent.

250 g of polymer PU-A1 at 70% w/w in HFE 7500 were obtained.

Acid content, measured by titration, was 0.2 eq/kg.

Preparation 2

Acid Polyurethane from Fomblin® Z DOL PFPE MW 2000 Containing 0.2 Eq/Kg of Acid Groups (PU-A2)

An acid polyurethane containing 0.2 eq/kg of acid groups was prepared from Fomblin Z DOL® perfluoropolyether having a MW of 2000 following the same procedure as in Preparation 1, using the reagents and solvents indicated below for each step 1 to 3.

In step 1):
IPDI (56.3 g, 507 meq);
Fomblin Z DOL® perfluoropolyether MW 2000 (200 g, 207 meq);
MEK (25 g);
dibutyltin dilaurate (DBTDL, 0.20 ml, 5% solution in AcOEt).
In step 2):
dimethylol propionic acid (DMPA, 6.94 g, 103.6 meq);
neopenthylglycole (5.39 g, 103.6 meq);
hydroxyethylmethacrylate (12.1 g, 93 meq);
triethylamine (TEA 4, 19 g) in MEK (50 g).
In step 3):
Novec® HFE 7500 (750 g)
isopropanol (250 g)
HCl 3% (added dropwise until acid pH)
demineralised water (500 g)
The final yield was 260 g of polymer PU-A2 in HFE solution at 65% w/w The acid content (measured by titration according to method 2) was 0.2 eq/Kg.

Preparation 3

Acid Polyurethane from Fomblin® Z DOL PFPE MW 2000 Containing 0.35 Eq/Kg of Acid Groups (PU-A3)

An acid polyurethane from Fomblin® Z DOL PFPE MW 2000 containing 0.35 eq/kg of acid groups was prepared following the same procedure as in Preparation 1, using the reagents and solvents indicated below for each step 1 to 3.

In step 1):
IPDI (24 g, 216 meq)
Fomblin Z DOL® perfluoropolyether MW 2000 (100 g, 88 meq)
MEK (25 ml)
dibutyltin dilaurate (DBTDL, 0.78 ml, 5% sol in AcOEt)
In step 2):
dimethylol propionic acid (DMPA 5.9 g, 88 meq)
hydroxyethylmetahacrylate (5.3 g, 41 meq)
triethylamine (TEA, 3.5 g) in MEK (35 ml)
In step 3):
Novec® HFE 7500 (754.5 g)
isopropanol (251 g)
HCl 3% (added dropwise until acid pH)
demineralised water (500 g).

The final yield of polymer PU-A3 was 130 g in HFE solution at 65% w/w.

The acid content (measured by titration, according to method 2) was 0.34 eq/Kg.

Preparation 4

Basic Polyurethane from Fomblin® Z DOL PFPE MW 4000 Containing 0.2 Eq/Kg of Amino Groups (PU-B1)

Step 1) Preparation of the Prepolymer

A glass reactor was charged with IPDI (13.6 g, 122 meq), Fomblin Z DOL® perfluoropolyether with MW 4000 (100 g, 51 meq) and MEK (10 g). The reaction mass was warmed up to 50° C. under mechanical stirring, then DBTDL (0.23 ml, 5% solution in AcOEt) was added. A spontaneous increase of the internal temperature to 55° C. was observed. Thereafter, the temperature was increased to 65° C. and kept at this value for two hours. The completion of the reaction was monitored by $^{19}$F-NMR.

Step 2) Chain-extension

The internal temperature or the reaction mixture from step 1 was lowered to 50° C. and 25 ml ethyl acetate was added. The temperature was increased again to 65° C. and DEAPD (3.73 g, 51 meq) was added dropwise as a diluted solution in MEK (25 g). After 30 minutes 2.7 g (20 meq) of HEMA was added. The completion of the reaction was monitored by IR, until disappearance of the typical —NCO band (2225 cm$^{-1}$). 250 g of HFE 7500 were added to the organic solution. This solution containing 20-30% w/w of solubilized polymer, was concentrated at 60° C. in vacuum, in order to completely remove MEK.

Preparation 5

Basic Polyurethane from Fomblin® Z DOL PFPE MW 2000 Containing 0.2 Eq/Kg of Amino Groups (PU-B2)

A basic polyurethane containing 0.2 eq/kg of amino groups was prepared starting from Fomblin® Z DOL perfluoropolyether having a MW of 2000, following the same procedure as in Preparation 4, using the reagents and solvents indicated below.

In step 1):
IPDI (27.8 g, 250 meq)
Fomblin Z DOL® perfluoropolyether MW 2000 (100 g, 104 meq)
MEK (20 g)
DBTDL (0.48 ml, 5% solution in AcOEt)
In step 2):
MEK (20 ml);
1,2-PD (1.97 g, 52 meq)
DEAPD (3.81 g, 52 meq) as diluted solution in MEK.
HEMA (5.5 g, 42 meq).

The final yield of polymer PU-B2 was 129 g.

The amino groups content (measured by titration according to method 3) was 0.20 eq/kg.

Preparation 6

Basic Polyurethane Containing 0.1 eq/kg Amino Groups from Fomblin® Z DOL PFPE MW 4000 (PU-B3)

A basic polyurethane containing 0.1 eq/kg amino groups was prepared from Fomblin® Z DOL PFPE MW 4000 following the same procedure as in Preparation 4, using the reagents and solvents indicated below.

In step 1):
IPDI (13.3 g, 120 meq)
Fomblin Z DOL® perfluoropolyether MW 4000 (100 g, 50 meq)
ethyl acetate (15 g)
DBTDL (0.23 ml, 5% solution in AcOEt)
In step 2):
ethyl acetate: 15 ml
1,2-PD (0.96 g, 25 meq)
DEAPD (1.87 g, 25 meq) as diluted solution in ethyl acetate;
HEMA (2.6 g, 20 meq)
The final yield of polymer PU-B3 was 114 g
The amino groups content (measured by titration according to method 3) was 0.10 eq/kg.

Preparation of Compositions and Coatings

Example 1

Preparation of Composition and Coating 1

Composition 1.
Polymer PU-A3 obtained according to the procedure disclosed above in preparation 3 was diluted at 50% (w/w) by adding HFE7500+IPA, so that the final HFE/IPA weight ratio was 10:1 (final viscosity 200 cSt). Similarly, polymer PU-B1 obtained according to the procedure disclosed above in preparation 4 was diluted at 50% (w/w) by adding HFE7500+IPA, so that the final HFE/IPA weight ratio was 10:1 (final viscosity 75 cSt). The two formulations were then mixed together in a weight ratio PU-A3/PU-B1 1/1.76, so that the different charges were fully balanced (final viscosity 288 cSt).

Coating 1.
After addition of 2-hydroxy-2-methyl-1-phenylpropan-1-one (4% w/w on the dry content) as photo-initiator, an aliquot of Composition 1 was tape-casted on different supports (glass and Al); after drying (30' at room temperature), the casted composition was irradiated by UV light under nitrogen atmosphere (oxygen content <20 ppm) using a 500 W medium-pressure Hg lamp (light intensity=12 mWcm-2 in the film surface). Coatings were obtained having a thickness in the range 70-80 microns.
Properties of coating 1:
hardness 6B
contact angle vs. $H_2O$: 115.2°; vs. $n-C_{12}$: 70.6°.

Example 2

Preparation of Composition and Coating 2

Composition and Coating 2 were prepared following the same procedure disclosed above in Example 1, using 4 g of polymer PU-A1 obtained as disclosed in Preparation 1 and 8 g of polymer PU-B3 obtained as disclosed in Preparation 6.
The kinematic viscosity of Composition 2 at 20° C. (concentration 20% w/w) was 273 cSt.
Coatings were obtained having a thickness in the range 40-50 microns.
Properties of Coating 2:
shore A 3": 54
contact angle: vs. $H_2O$: 118.3°; vs. $n-C_{12}$: 66.4°

Example 3

Preparation of Composition and Coating 3

Composition and Coating 3 were prepared following the same procedure disclosed above in Example 1, using 6 g of polymer PU-A1 obtained as disclosed in Preparation 1 and 6 g of polymer PU-B1 obtained as disclosed in Preparation 4.
The kinematic viscosity of Composition 3 (concentration 20% w/w) at 20° C. was 1163 cSt.
Coatings were obtained having a thickness in the range 40-50 microns.
Properties of Coating 3:
Shore A 3": 60
contact angle: vs. $H_2O$: 116°; vs. $n-C_{12}$: 65.2°.

Example 4

Preparation of Composition and Coating 4

Composition and Coating 4 were prepared following the same procedure disclosed above in Example 1, using 9.6 g of polymer PU-A3 obtained as disclosed in Preparation 3 above and 16.3 g of polymer PU-B1 obtained as disclosed in Preparation 4 above.
57.6 g of a mixture of Novec® HFE 7500 and isopropanol (in a ratio 10:1 w/w) were used for the preparation of the Composition 4 (20% w/w).
The kinematic viscosity of Composition 4 at 20° C. was 179 cSt.
Coatings were obtained having a thickness in the range 40-50 microns.

Example 5

Preparation of Composition and Coating 5

Composition and Coating 5 were prepared following the same procedure disclosed above in Example 1, using 9.6 g of polymer PU-A3 obtained as disclosed above in Preparation 3 and 16.3 g of polymer PU-B1 obtained as disclosed above in Preparation 4.
57.6 g of a mixture of Novec® HFE 7500 and 1-tert-butoxy-2-propanol (in a ratio 10:1 w/w) were used for the preparation of Composition 5 (20% w/w).
The kinematic viscosity of Composition 5 at 20° C. was 230 cSt.
Coatings were obtained having a thickness in the range 40-50 microns.

Example 6

Preparation of Composition and Coating 6

Composition and Coating 6 were prepared following the same procedure disclosed above in Example 1, using 9.6 g of polymer PU-A3 obtained as disclosed above in Preparation 3 and 16.3 g of polymer PU-B1 obtained as disclosed above in Preparation 4.
57.6 g of a mixture of Novec® HFE 7500 and propylene glycol-mono methyl ether-acetate (PMA) (in a ratio 10:2 w/w) were used for the preparation of Composition 6 (20% w/w).

The kinematic viscosity of Composition 6 at 20° C. was 270 cSt.

Coatings were obtained having a thickness in the range 40-50 microns.

Example 7

Preparation of Comparative Composition and Comparative Coating 4A

Comparative composition and comparative coating 4A were prepared by following the procedure disclosed in Example 4A of WO 2014/090646.

Composition 4A was tape-casted on polycarbonate Lexan® from Sabic and polymethyl methacrylate (PMMA) Acrylire® from Evonik Cyro. After drying (3 hours at room temperature, 1 hour at 80° C. under wet atmosphere and 2 hours at 110° C.), a cross-linked film was obtained.

After drying, the plastic substrate underwent to a severe thermal distortion.

Example 8

Preparation of Comparative Composition and Comparative Coating 12

Comparative composition and comparative coating 12 was prepared by following the procedure disclosed in Example 12 of WO 2014/090646.

Composition and Coating 12 were prepared using composition 11A after the reaction step at 80° C. (2 h). The solution was cooled down at room temperature.

After 2 hours, the viscosity of the solution increased so much that it was not possible to add TEOS as described in Example 12 of WO 2014/090646 and to obtain the corresponding film.

Evaluation of the Compositions

Tests 1 and 2—Cross Cut Test and Double Rub Test on Glass Support

The cross cut test and the double rub tests were carried out as described in the section "Methods", using a glass support sized 10×10 cm with a 0.2 cm average thickness as support. The fluorinated coating thickness ranged between 40 and 80 µm. The results are reported in Table 1 below.

TABLE 1

| Compositions | Cross cut test (percentage of squares remained on the glass support) | Double rub (DR) test with MEK |
| --- | --- | --- |
| 1 | 100% | 100 DR |
| 2 | 100% | 70 DR |
| 3 | 100% | 80 DR |
| 4 | 100% | 90 DR |
| 5 | 100% | 80 DR |
| 6 | 100% | 85 DR |

Test 3—Scratch Test on Glass Supports

The scratch test on glass supports was performed as described in the section Methods above. The results are reported in Table 2 below. In the table, "cs" stands for "circular scratches".

TABLE 2

| Composition | Scratch Test Time = 0 | Scratch Test Time = 1 week | Scratch Test Time = 14 days |
| --- | --- | --- | --- |
| 1 | 4N | 5N | 6N |
| 2 | 5N | 5N | 6N |
| 3 | 6N | 7N | 8N |
| 4 | 6N | 7N | 10N |

Tests 4 and 5—Cross-cut Test and Double Rub Test on Al Q Panel Support

The cross cut test and the double rub tests were carried out as described in the section "Methods", using a Q Panel (aluminium plate sized 7×15 cm with average thickness of 0.6 mm). The fluorinated coating thickness ranged between 40 and 80 µm.

TABLE 3

| Composition | Cross Cut | DR MEK |
| --- | --- | --- |
| 1 | 100/100 | 110 DR |
| 2 | 100/100 | 80 DR |
| 3 | 100/100 | 100 DR |
| 4 | 100/100 | 120 DR |
| 5 | 100/100 | 85 DR |
| 6 | 100/100 | 95 DR |

Test 6—Spot Test on Al Q-Panel

Evaluation of chemical resistance after 30 minutes is reported in Table 4 below.

TABLE 4

| Composition | MeOH | Toluene | EtOH | Acetone | MEK | EtAc | BuAc |
| --- | --- | --- | --- | --- | --- | --- | --- |
| 1 | + | − | − | + | − | − | − |
| 2 | + | − | − | + | − | − | − |
| 3 | + | − | − | + | − | − | − |
| 4 | + | − | − | + | − | − | − |
| 5 | + | − | − | + | − | − | − |

Rating for Table 5 was as follows:
− No effect
+ Very light shadow
+ + Light shadow
+ + + Film surface lightly damaged
+ + + + Film surface strongly damaged
+ + + + + Film destroyed

The invention claimed is:

1. A non-aqueous fluoropolymer composition (FC) comprising:
   at least one fluorinated ionisable polymer (A) comprising recurring (per)fluorinated blocks (F), recurring functional blocks ($B_a$) and at least one curable group (C), said blocks ($B_a$) comprising at least one ionisable anionic group ($I^-$);
   at least one fluorinated ionisable polymer (B) comprising recurring (per)fluorinated blocks (F), recurring functional blocks ($B_b$) and at least one curable group (C), said blocks ($B_b$) comprising at least one ionisable cationic group ($I^+$);
   at least one fluorinated solvent (F); and
   at least one solvent (S) different from said solvent (F).

2. The non-aqueous fluoropolymer composition (FC) according to claim 1, wherein said blocks (F) and said blocks ($B_a$) are linked together by at least one moiety (U) selected from urethane moieties and urea moieties.

3. The non-aqueous fluoropolymer composition (FC) according to claim 1, wherein said blocks (F) and said blocks ($B_b$) are linked together by at least one moiety (U) selected from urethane moieties and urea moieties.

4. The non-aqueous fluoropolymer composition (FC) according to claim 1, wherein said at least one group (C) is a group derived from acrylate or 2-alkyl acrylate.

5. The non-aqueous fluoropolymer composition (FC) according to claim 1, wherein said at least one group (C) is a UV curable group or a thermally curable group.

6. The non-aqueous fluoropolymer composition (FC) according to claim 5, wherein said at least one group (C) is a UV-curable group derived from an acrylate or a 2-alkyl acrylate.

7. The non-aqueous fluoropolymer composition (FC) according to claim 1, wherein said solvent (F) is a hydrocarbon or aromatic solvent containing one or more fluorine atoms and, optionally, one or more oxygen atoms.

8. The non-aqueous fluoropolymer composition (FC) according to claim 1, wherein said solvent (S) is selected from alcohols and aprotic dipolar solvents.

9. The non-aqueous fluoropolymer composition (FC) according to claim 1, wherein said composition (FC) further comprises a photo-initiator.

10. A process for the preparation of a non-aqueous fluoropolymer composition (FC) as defined in claim 1, said process comprising:
    mixing polymer (A) and polymer (B) in at least one fluorinated solvent (F) and in at least one solvent (S) different from said solvent (F), wherein:
    polymer (A) comprises recurring (per)fluorinated blocks (F), recurring functional blocks ($B_a$) and at least one curable group (C), said blocks ($B_a$) comprising at least one ionisable anionic group ($I^-$); and
    polymer (B) comprises recurring (per)fluorinated blocks (F), recurring functional blocks ($B_b$) and at least one curable group (C), said blocks ($B_b$) comprising at least one ionisable cationic group ($I^+$).

11. The process according to claim 10, said process further comprising step (iv) of adding a photo-initiator.

12. A polymeric article made from a composition according to claim 1.

13. The polymeric article according to claim 12, said article being in the form of a sealing agent, a gasket, a membrane, a film and a coating.

14. A process for preparing the polymeric article according to claim 12, said process comprising:
    film-casting or moulding non-aqueous fluoropolymer composition (FC) and
    curing said composition (FC) by thermal- or UV activated-crosslinking, wherein composition (FC) comprises:
        at least one fluorinated ionisable polymer (A) comprising recurring (per)fluorinated blocks (F), recurring functional blocks ($B_a$) and at least one curable group (C), said blocks ($B_a$) comprising at least one ionisable anionic group ($I^-$);
        at least one fluorinated ionisable polymer (B) comprising recurring (per)fluorinated blocks (F), recurring functional blocks ($B_b$) and at least one curable group (C), said blocks ($B_b$) comprising at least one ionisable cationic group ($I^+$);
        at least one fluorinated solvent (F); and
        at least one solvent (S) different from said solvent (F).

* * * * *